(12) United States Patent
Joern

(10) Patent No.: US 11,021,226 B2
(45) Date of Patent: Jun. 1, 2021

(54) METHOD FOR PRODUCING A FUSELAGE PORTION

(71) Applicant: Airbus Operations GmbH, Hamburg (DE)

(72) Inventor: Paul Joern, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 797 days.

(21) Appl. No.: 15/615,460

(22) Filed: Jun. 6, 2017

(65) Prior Publication Data
US 2017/0355434 A1 Dec. 14, 2017

(30) Foreign Application Priority Data

Jun. 8, 2016 (DE) .......................... 102016210079.3

(51) Int. Cl.
| | | |
|---|---|---|
| *B64C 1/12* | (2006.01) | |
| *B64C 1/06* | (2006.01) | |
| *B29C 65/00* | (2006.01) | |
| *B29C 65/08* | (2006.01) | |
| *B29L 31/30* | (2006.01) | |
| *B29C 65/18* | (2006.01) | |
| *B29C 65/10* | (2006.01) | |
| *B29C 65/02* | (2006.01) | |
| *B29C 65/16* | (2006.01) | |

(52) U.S. Cl.
CPC .......... *B64C 1/12* (2013.01); *B29C 66/30223* (2013.01); *B29C 66/30325* (2013.01); *B64C 1/06* (2013.01); *B64C 1/069* (2013.01); *B29C 65/02* (2013.01); *B29C 65/08* (2013.01); *B29C 65/10* (2013.01); *B29C 65/16* (2013.01); *B29C 65/18* (2013.01); *B29C 66/3494* (2013.01); *B29C 66/721* (2013.01); *B29C 66/7212* (2013.01); *B29C 66/73921* (2013.01); *B29L 2031/3082* (2013.01)

(58) Field of Classification Search
CPC .. B64C 1/12; B64C 1/06; B64C 1/064; B64C 1/068; B64C 1/069
See application file for complete search history.

(56) References Cited

U.S. PATENT DOCUMENTS

| 7,159,822 B2 * | 1/2007 | Grantham ................. | B64C 1/12 244/119 |
| 8,783,610 B2 * | 7/2014 | Stephan ................. | B64C 1/069 244/120 |

(Continued)

FOREIGN PATENT DOCUMENTS

DE      102014103438      1/2015

OTHER PUBLICATIONS

German Search Report, dated Apr. 24, 2017, priority document.

*Primary Examiner* — Richard R. Green
*Assistant Examiner* — Steven J Shur
(74) *Attorney, Agent, or Firm* — Greer, Burns & Crain, Ltd.

(57) ABSTRACT

A method for producing a fuselage portion, in particular for an aircraft or spacecraft, has the following method steps: welding a skin portion containing a thermoplastic material with a former containing a thermoplastic material in the region of a predetermined welding zone; and connecting an attachment element, configured as a crack stopper, to the skin portion and to the former in the region of the welding zone.

13 Claims, 2 Drawing Sheets

(56) References Cited

U.S. PATENT DOCUMENTS

2006/0226287 A1    10/2006   Grantham et al.
2010/0237194 A1    9/2010   Stephan
2014/0079903 A1    3/2014   Hugon et al.
2014/0129987 A1    5/2014   Feit et al.

\* cited by examiner

METHOD FOR PRODUCING A FUSELAGE PORTION

CROSS REFERENCES TO RELATED APPLICATIONS

This application claims the benefit of the German patent application No. 10 2016 210 079.3 filed on Jun. 8, 2016, the entire disclosures of which are incorporated herein by way of reference.

FIELD OF THE INVENTION

The present invention relates to a method for producing a fuselage portion, in particular for an aircraft or spacecraft, and to a fuselage portion and to an aircraft or spacecraft having a fuselage portion of this type.

Although the present invention and the problem it addresses can be applied to any type of fuselage, they will be described in detail in respect of an aircraft fuselage.

BACKGROUND OF THE INVENTION

Modern aircraft fuselages are often constructed using fiber-reinforced plastics, inter alia. An aircraft fuselage usually has skin portions as well as stringers and formers which support the skin portions. Stringers run in the longitudinal direction of the fuselage, while formers run in the circumferential direction.

Riveting methods are usually employed to attach formers, in particular to the skin portions. For this purpose, connecting elements, known as clips, and former stabilizing elements, known as cleats, are respectively riveted with the skin and with the former. A method and arrangement of this type are described for example in DE 10 2014 103 438 A1.

SUMMARY OF THE INVENTION

In view of the above, it is an idea of the present invention to provide an improved method for producing a fuselage portion and also to provide a corresponding improved fuselage portion.

Accordingly, there is provided:

A method for producing a fuselage portion, in particular for an aircraft or spacecraft, having the following method steps: welding a skin portion containing a thermoplastic material with a former containing a thermoplastic material in the region of a predetermined welding zone; and connecting an attachment element, configured as a crack stopper, to the skin portion and to the former in the region of the welding zone.

A fuselage portion, in particular for an aircraft or spacecraft, or in an aircraft or spacecraft, in particular produced according to a method of the invention, comprising: a skin portion and a former, the skin portion and the former each containing a thermoplastic material and being welded together in a welding zone, an attachment element which is connected to the skin portion and to the former and is configured as a crack stopper being provided in the region of the welding zone.

An aircraft or spacecraft, with a fuselage which has a fuselage portion according to the invention or a fuselage portion produced according to a method of the invention.

A fundamental idea of the present invention is that a fuselage arrangement is formed having a skin portion and a former which each contain a thermoplastic material and are welded together in a welding zone for attachment purposes.

In addition, attachment elements which are configured according to the invention as crack stoppers are provided in the welding zone and they are connected to the former and to the skin portion.

The skin portion and the former can be configured in many different ways and can contain a thermoplastic material. For example, this can be a fiber composite material with a thermoplastic matrix or a multi-layered structure with at least one thermoplastic layer. In particular, the skin portion and the former do not need to consist entirely of thermoplastic material. Instead, it is possible for merely portions, just one layer or just one region of the welding zone to comprise the thermoplastic material. Furthermore, it would be conceivable to provide a thermoplastic cover layer or a differently formed additional material for welding to the skin portion and/or to the former.

A welding zone can be configured in many different ways. For example, it can be configured as a flat welding zone, as a linear welding seam, as a surface surrounded by a welded joint, as a surface provided with a multiplicity of welding spots or with a welding pattern, or the like.

The skin is welded to the former in the welding zone by thermoplastic welding. Thus, the skin portion and the former can be joined together in a relatively simple and fast welding process, instead of by the usually labor-intensive rivet joints. In this way, it is possible to minimize production costs as well as processing times.

For thermoplastic welding, depending on the type of welding method employed, it is possible to work with or without additional materials, thermoplastic adhesives or the like.

The internal pressure load in the fuselage of an aircraft can lead to the former peeling away from the skin portion. Therefore, rivet joints which prevent this type of peeling-off action are usually required for approval in aviation. The additional attachment elements configured as crack stoppers can be used for the damage tolerance of the joint and they prevent the formation and/or progression of cracks, and thus they prevent detachment. This means that the welded joint can be approved for aviation.

The attachment elements can be specifically provided locally on portions of the welding zone which are under relatively high loads and are more susceptible to cracks, in particular in the region of the beginning or runout of the welding zone. This advantageously prevents the start of a crack.

Furthermore, unlike conventional rivet joints, the attachment elements can also be placed singly and/or in relatively large or generous spacings which are enough to prevent the progression of a crack, since the actual attachment or connection is provided by the welded joint. Advantageously therefore, significantly fewer attachment elements are required than in the case of conventional rivet joints. Overall, the production of the welded joint, together with the introduction of the attachment elements therefore requires a significantly reduced working effort. The described solution thus plays a part in optimizing the weight and cost.

According to a further development, the former is configured with a through-recess at which the welding zone is interrupted. In this respect, the attachment element is arranged in the region of a runout or beginning, adjoining the through-recess, of the welding zone. When loads occur, a flow of forces is frequently concentrated in the region of the beginning or runout of the welding zone, which flow of forces leads to locally increased tensions. The attachment element which is arranged in the region of the beginning or runout of the welding zone thereby reinforces the region of the welding zone which is exposed to the greatest loads. This effectively prevents the beginning of cracks and thus prevents detachment.

According to one embodiment, the attachment element is connected to the skin portion and to the former in a form-locking and/or force-locking manner. This can be performed, for example, by riveting, screwing or by other types of bolt connection. Also conceivable is a form-locking attachment on one side and a force-locking attachment on the other side of the attachment element. Alternatively or additionally, combinations of a force-locking or form-locking connection with an integral bond are also conceivable. The attachment element can be connected to the skin portion and to the former after the welding process in the region of the welding zone, so that the welding process is advantageously not affected thereby.

According to a further embodiment, the attachment element is integrally bonded with the skin portion and the former. This means that more complex mechanical attachment steps can advantageously be avoided during production.

According to another development, the attachment element is also melted into the welding zone during the welding process to produce an integral bond with the skin portion and the former. Thus, an additional working step is advantageously not required for connecting the attachment element to the skin portion and to the former. For example, the attachment element can be a pin. In particular, before welding, this pin can be inserted into a recess provided in the region of the welding zone. During the welding procedure, the thermoplastic material of the former and of the skin portion melts and joins with the material of the attachment element, thereby producing an integral bond.

It would also be conceivable to configure the attachment element with an undercut, for example with a head and/or with a foot and/or with a narrowing which is filled with melt during welding in the melting bath so that in addition to an integral bond, a form-locking connection of the attachment element to the former and/or to the skin is also formed during welding.

Furthermore, it is conceivable to immerse the attachment element in the welding zone or in the thermoplastic material, so that it is encapsulated in the welding zone, in particular. Therefore, the attachment element does not need to fully penetrate the material. In this way, for example, a contact corrosion protection can also be provided at the same time as the connection for a carbon fiber-reinforced plastics of the material of the skin portion and/or former. It is thereby advantageously possible to omit or reduce other measures for contact corrosion protection.

According to one embodiment, the skin portion and/or former is provided as a fiber composite component. In this case, the attachment element displaces fibers of the fiber composite component during welding in the welding zone without destroying them. For this purpose, the attachment element can be introduced into the welding zone such that fibers are displaced but are not severed. In this way, the fiber structure is advantageously not damaged.

According to one embodiment of a fuselage arrangement, a stringer is provided which runs transversely to the former and is connected to the skin portion. In an intersection region, the former in this case has a through-recess for the stringer, at which the welding zone is interrupted. In particular, the stringer also contains a thermoplastic material and is also provided welded to the skin portion, for example. In one embodiment, an attachment element which is connected to the skin and to the stringer can also be provided in a welding zone of the stringer. This advantageously produces a fuselage structure which is reinforced by stringers and formers and which can be produced with a relatively low production effort and has a high damage tolerance.

According to a further development, the attachment element is arranged in the region of a runout or beginning, adjoining the through-recess, of the welding zone. Since the beginning or start and runout or end region are often the most heavily loaded portions of the welding zone, it is in these regions that the greatest tension often arises. The start of a crack and thus a detachment or delamination is effectively prevented with the attachment element in the region of the runout or beginning.

According to one embodiment of the fuselage portion, the attachment element is configured to be connected to the skin portion and/or to the former in a form-locking and/or force-locking manner. For example, the attachment element is configured in the form of a rivet or in the form of a bolt. In this respect, a standard tool can be used for this which is also used for conventional connections with rivets or bolts. Alternatively or additionally, combinations of a force-locking and/or form-locking connection and/or an integral bond are also conceivable. Accordingly, it is also possible to provide a form lock only with the skin portion or only with the former, and to provide a force lock on the other side of the attachment element. It would also be conceivable for only the skin portion or the former to be connected to the attachment element in a form-locking and/or force-locking manner, while a different connection, for example an integral bond, is provided on the other side of the attachment element.

According to a further embodiment, the attachment element is integrally bonded with the skin portion and/or with the former. In particular, the attachment element can be a pin which is melted into the welding zone. In this respect, the attachment element can be arranged in particular such that it is immersed in the welding zone. In this way, the attachment element is advantageously encapsulated, thereby avoiding contact corrosion problems.

In one embodiment, the pin can have an undercut and/or a narrowing and/or the like for the additional formation of a form lock.

According to one embodiment, the skin portion and/or the former is configured as a fiber composite component, in which case, fibers of the fiber composite component are arranged such that they are displaced by the attachment element without being destroyed in the welding zone. In this way, the fiber structure is advantageously not damaged, in spite of the attachment element.

According to another embodiment, a multiplicity of attachment elements is provided. In this case, the attachment elements are respectively arranged at a predetermined distance from one another in the welding zone. A predetermined distance of this type can be greater than 10 cm. In particular, the distance is more than 50 cm. For example, the distance can be within a range of between 50 cm and 1 m. In this way, only relatively few attachment elements are advantageously required, which significantly reduces the production costs. Nevertheless, with competent positioning, this spacing of the attachment elements suffices in effectively preventing crack formation and detachment or delamination. In particular, the positioning of the attachment elements is provided for this purpose in the most heavily loaded portions of the welding zone.

The above embodiments and developments can be combined together in any sensible manner. In particular, all the features of the method for the production of the fuselage portion can be applied to the fuselage portion, and vice versa.

Further possible embodiments, developments and implementations of the invention also include combinations, not explicitly mentioned, of features of the invention described previously or in the following with respect to the embodiments. In this respect, in particular a person skilled in the art will also add individual aspects as improvements or additions to the respective basic form of the present invention.

BRIEF DESCRIPTION OF THE DRAWINGS

In the following, the invention will be described in more detail on the basis of an embodiment with reference to the accompanying drawings. In the drawings, the same reference numerals denote identical or functionally identical components, unless indicated otherwise.

DETAILED DESCRIPTION OF THE PREFERRED EMBODIMENTS

Figure 1:
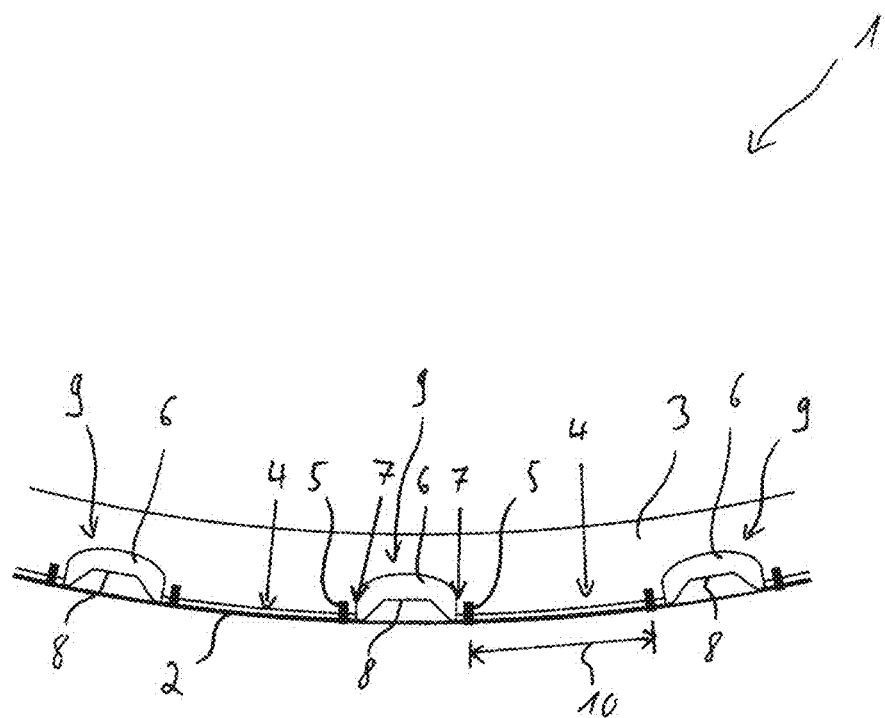
FIG. 1 is a schematic cross-sectional view of a fuselage portion.

The fuselage portion 1 shown in FIG. 1 has a skin portion 2 and a former 3.

Figure 2:
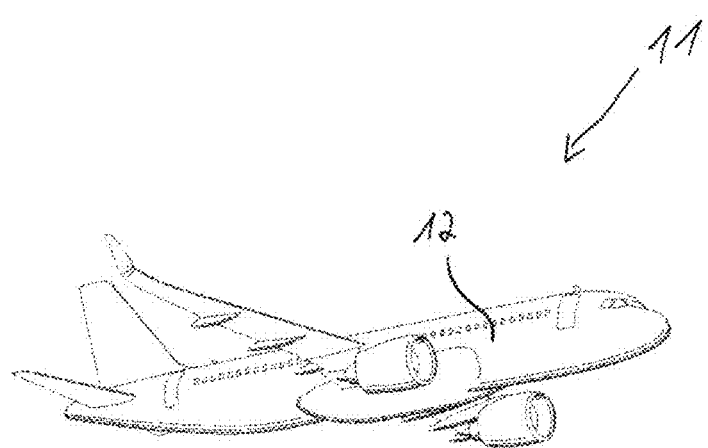
FIG. 2 is a perspective view of an aircraft or spacecraft.

The skin portion 2 has a curved shape corresponding to the round form of a fuselage 12 shown in FIG. 2. Accordingly, the former 3 also has a corresponding curvature on its radial outer side to which the skin portion 2 is attached.

The fuselage portion 1 also has a plurality of stringers 8 which are oriented substantially in the longitudinal direction of the fuselage 12 which, in the cross-sectional view shown, runs into the plane of the drawing.

The stringers 8 intersect the former 3 in intersection regions 9, for which purpose through-recesses 6 are respectively provided in the former 3. Here, the through-recesses 6 are curved purely by way of example.

The skin portion 2 and the former 3 are formed, for example, from a fiber composite material with a thermoplastic matrix. In particular, the skin portion 2 can be produced by a tape laying method.

The attachment of the skin portion 2 to the former 3 is realized by welding zones 4 in which the skin portion 2 is welded thermoplastically to the former 3.

The welding zones are interrupted in the region of the through-recesses 6.

Provided inside each of the welding zones 4 are additional attachment elements 5 which are configured as crack stoppers. They are respectively arranged in the region of a beginning or runout 7 of a welding zone 4.

A beginning or runout respectively denotes the end of a continuous welding zone. For example, it can be the beginning or a runout of a weld seam.

The welding zone 4 can have a width which exceeds the width or the diameter of the attachment element 5.

To produce the fuselage portion 1, the skin portion 2 and the former 3 are welded thermoplastically in the predetermined welding zones 4. For example, this can be carried out by means of heat conduction welding or ultrasonic welding or hot-gas welding. Other welding processes, for example a laser beam welding process, are also possible.

For example, in hot-gas welding, the surfaces to be joined together are heated by hot air to the welding temperature and are welded under pressure. In particular, the welding process comprises the following steps: preparing the welding surfaces in the region of the predetermined welding zone; heating the welding zone; joining together the skin portion and the stringer while simultaneously applying a welding pressure; cooling the welded joint while maintaining the welding pressure; removing the welding pressure from the welded material.

Furthermore, in the welding zones 4, the attachment elements 5 are introduced in the region of a beginning or runout 7 of each welding zone 4.

For example, during production, the attachment elements 5 can be introduced into the welding zone 4 after welding. In this case, the attachment elements 4 can be rivets which are introduced into the solidified welding zone 4. Alternatively, they can also be all kinds of conventional types of bolts.

As a further alternative, the attachment element 5 can also be melted into the welding zone 4 during the welding process. For example, in this case, the attachment elements 5 can be pins which are melted into the welding zone during welding. For this purpose, the pins can be positioned inside the predetermined welding zone 4 before welding, for example. In particular, appropriate positioning recesses, for example holes, can be provided in the predetermined welding zone before welding. When the thermoplastic material is melted on, the attachment elements are also melted or embedded therein and in this way, are bonded integrally with the thermoplastic material.

The fibers of the fiber composite material of the skin portion and of the former are not damaged thereby. Instead, the fibers can be displaced by the attachment elements in the melting bath, so that advantageously the fibers are not damaged.

In this respect, the attachment elements themselves can remain fixed, so that after the thermoplastic melt has solidified, they are embedded in their original form in the intended position and are integrally bonded with the skin portion 2 and with the former 3.

The welded joint between the former and the skin portion is realized in a damage-tolerant manner by means of the attachment elements 5. In the event of a detachment, a possible crack or crack progression is always halted at the closest attachment element 5. In this way, the fuselage portion 1 can be certified in aviation in spite of a welded joint between the skin portion and the former.

The stringers 8 are configured, for example, as omega stringers and are also formed from a fiber composite material with a thermoplastic matrix. Accordingly, the stringers can also be provided such that they are welded with the skin portion.

FIG. 2 shows an aircraft or spacecraft 11 in the form of a passenger aircraft.

The aircraft or spacecraft 11 has a fuselage 12 which has at least one fuselage portion 1 formed according to FIG. 1.

The entire fuselage 12 can be produced in the construction style described according to FIG. 1 and thus contains a plurality of fuselage portions 1 of this type.

Although the present invention has been described above on the basis of various embodiments, it is not restricted thereto but can be modified in many different ways.

For example, additional attachment elements 5 can be also arranged between the beginning and the runout 7 inside a welding zone 4. This is particularly appropriate when the stringers 8 or the through-recesses 6 are spaced apart from one another by more than 1 m to halt possible cracks at an early stage. The additional attachment elements 5 can then also be arranged at a distance of between 50 cm and 1 m from the attachment elements provided at the beginning or runout 7.

Instead of omega stringers, it is also possible to provide other types or shapes of stringers 8. Accordingly, the through-recesses 6 of the former 3 do not necessarily have to be curved, but they can also have a different shape which is adapted to the shape of the stringers.

Furthermore, to realize the concept according to the invention, the stringers do not necessarily also have to contain a thermoplastic material or have to be welded onto the skin.

The thermoplastic material is only necessary for the former 3 and the skin portion 2 to form the welding zone. However, it would also be possible to use a thermoplastic material locally only or just as a layer, an outer coating or optionally as an additional material for joining the former to the skin portion, so that the former and/or the skin portion optionally only contain the thermoplastic material in the welded state in the region of the welding zone.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuselage portion comprising:
a skin portion; and
a former,
wherein the skin portion and the former each contain a thermoplastic material and are welded together in a welding zone comprising a welded joint between the skin and the former, and
wherein provided in the region of the welding zone is a separate attachment element comprising a mechanical fastener which is connected to the skin portion and to the former and is configured as a crack stopper,
wherein a stringer is provided which runs transversely to the former and is connected to the skin portion, the former having in an intersection region a through-recess for the stringer, at which through-recess the welding zone is interrupted,
wherein the separate attachment element is arranged on portions of the welding zone which are under relatively high loads in a region of a runout or beginning, adjoining the through-recess, of the welding zone,
wherein the welding zone is otherwise free of the separate attachment element in a region of the welding zone between a first through-recess and a second through-recess in the former, and
wherein the stringer is free from any separate attachment element in the region of a runout or beginning of the welding zone.

2. The fuselage portion of claim 1, wherein the attachment element is configured such that it is connected to at least one of the skin portion and the former in at least one of a form-locking and force-locking manner.

3. The fuselage portion of claim 2, wherein the attachment element is a rivet or a screw.

4. The fuselage portion of claim 1, wherein the attachment element is configured such that it is integrally bonded with at least one of the skin portion and the former.

5. The fuselage portion of claim 4, wherein the attachment element is a pin which is melted into the welding zone.

6. The fuselage portion according to claim 4, wherein at least one of the skin portion and the former is configured as a fiber composite component, fibers of the fiber composite component being arranged such that they are displaced, without being destroyed by the attachment element in the welding zone.

7. The fuselage portion of claim 1, wherein a multiplicity of attachment elements is provided, the attachment elements being respectively arranged in the welding zone at a predetermined distance from one another.

8. The fuselage portion of claim 7, wherein the attachment elements are arranged in the welding zone at a distance of more than 10 cm.

9. The fuselage portion of claim 8, wherein the attachment elements are arranged in the welding zone at a distance of more than 50 cm.

10. The fuselage portion of claim 9, wherein the attachment elements are arranged in the welding zone at a distance between 50 cm and 1 m.

11. The fuselage portion of claim 1, wherein when loads occur, a flow of forces is concentrated in the region of the beginning or runout of the welding zone, which flow of forces leads to locally increased tensions, and wherein the separate attachment element thereby reinforces a region of the welding zone which is exposed to the greatest loads, wherein a beginning of a crack is effectively prevented and a detachment of the former from the skin is prevented.

12. An aircraft or spacecraft, having a fuselage which has a fuselage portion comprising
a skin portion; and
a former,
wherein the skin portion and the former each contain a thermoplastic material and are welded together in a welding zone comprising a welded joint between the skin and the former, and
wherein provided in the region of the welding zone is a separate attachment element comprising a mechanical fastener which is connected to the skin portion and to the former and is configured as a crack stopper,
wherein a stringer is provided which runs transversely to the former and is connected to the skin portion, the former having in an intersection region a through-recess for the stringer, at which through-recess the welding zone is interrupted,
wherein the separate attachment element is arranged on portions of the welding zone which are under relatively high loads in a region of a runout or beginning, adjoining the through-recess, of the welding zone,
wherein the welding zone is otherwise free of the separate attachment element in a region of the welding zone between a first through-recess and a second through-recess in the former, and
wherein the stringer is free from any separate attachment element in the region of a runout or beginning of the welding zone.

13. The aircraft or spacecraft of claim 12, wherein when loads occur, a flow of forces is concentrated in the region of the beginning or runout of the welding zone, which flow of forces leads to locally increased tensions, and wherein the separate attachment element thereby reinforces a region of the welding zone which is exposed to the greatest loads, wherein a beginning of a crack is effectively prevented and a detachment of the former from the skin is prevented.

\* \* \* \* \*